Oct. 31, 1961    J. P. JONES    3,006,130
TREE SHAKER APPARATUS
Filed Oct. 5, 1959    2 Sheets-Sheet 1
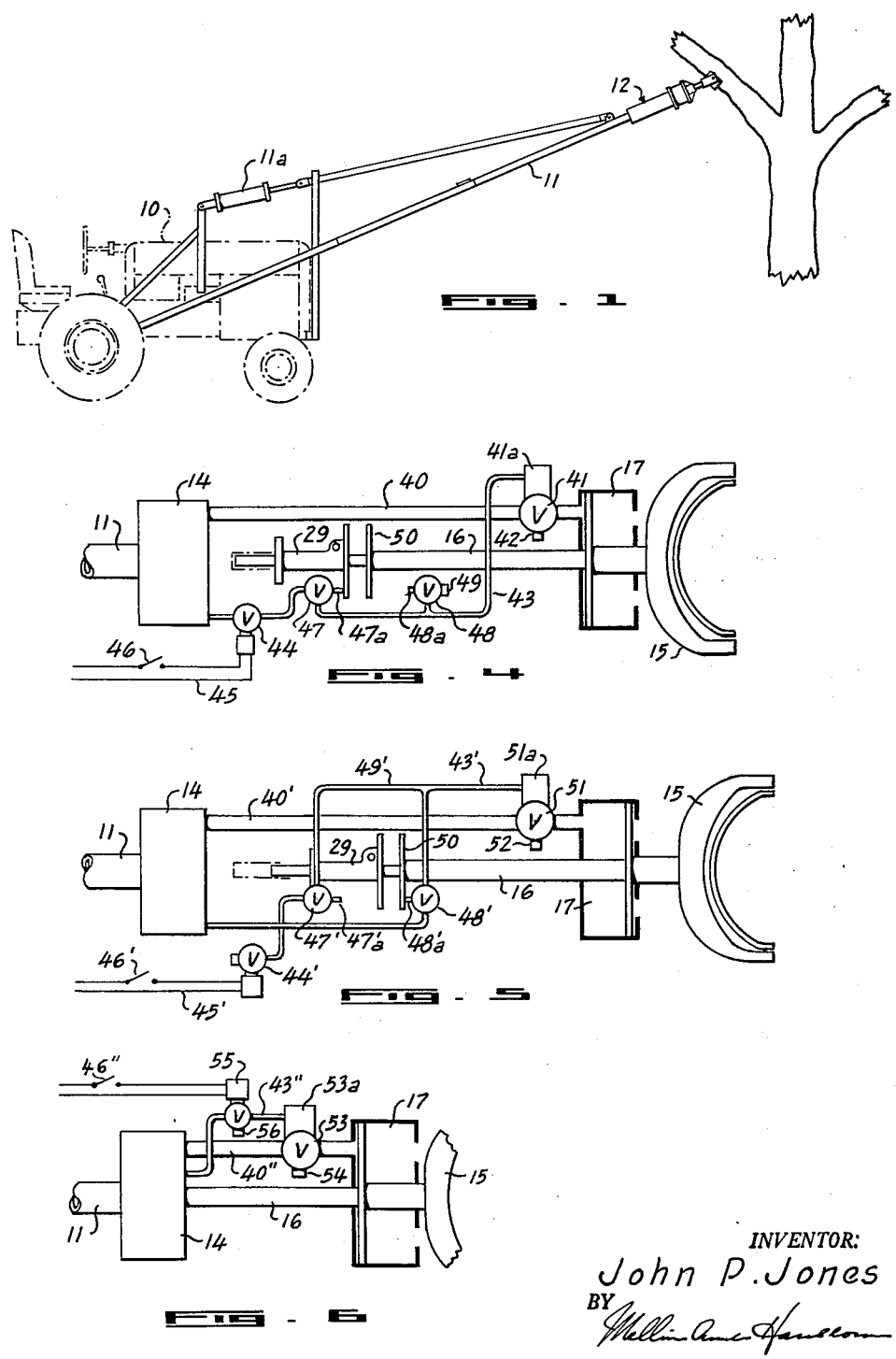
INVENTOR:
John P. Jones
BY
ATTORNEYS Oct. 31, 1961  J. P. JONES  3,006,130
TREE SHAKER APPARATUS
Filed Oct. 5, 1959  2 Sheets-Sheet 2
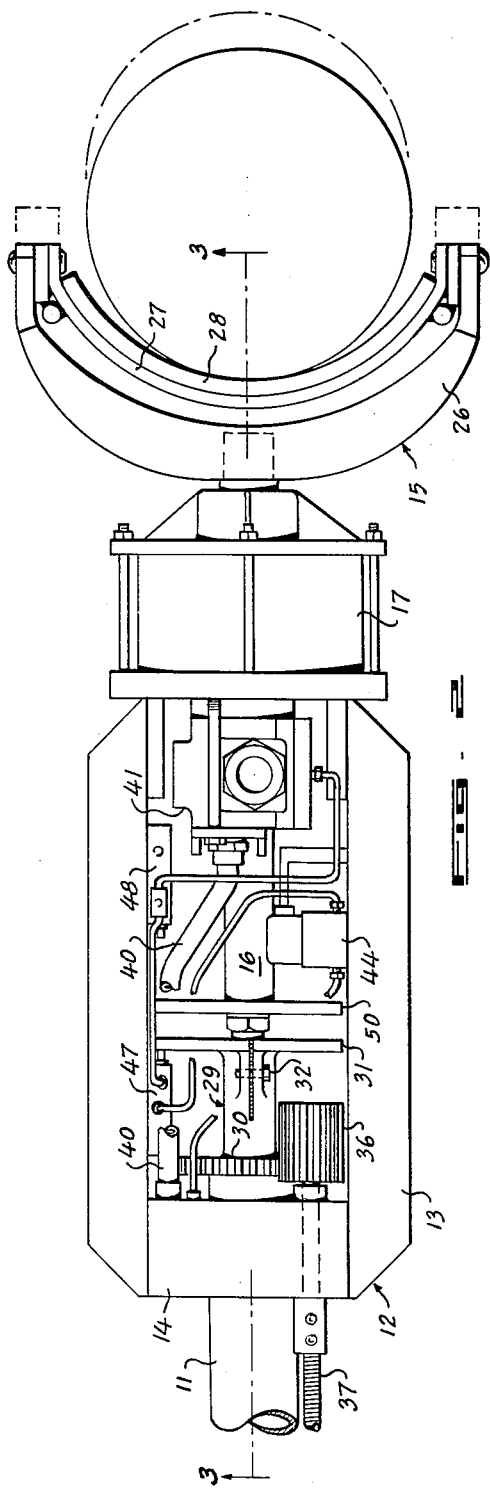
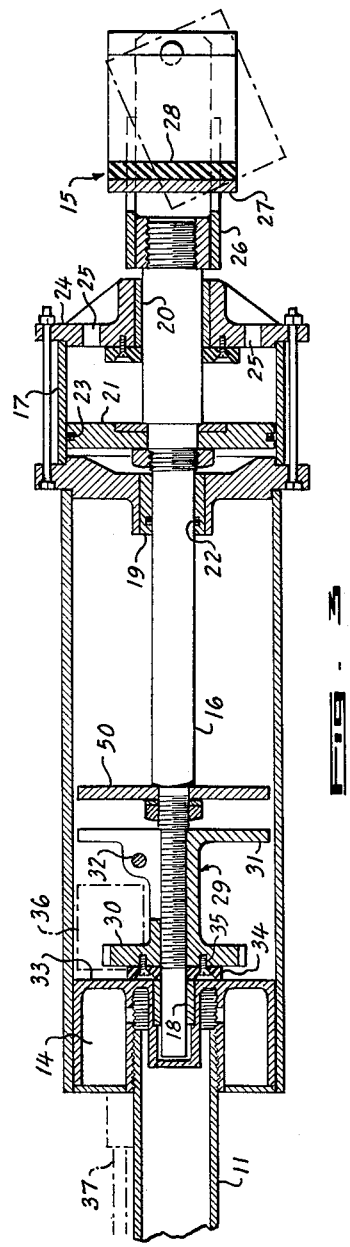
INVENTOR:
John P. Jones
BY
Mellin and Hanscom
ATTORNEYS

United States Patent Office 3,006,130
Patented Oct. 31, 1961

3,006,130
TREE SHAKER APPARATUS
John P. Jones, Vaughn, Wash., assignor to A. D. Goodwin & Son, Inc., Manteca, Calif., a corporation of California
Filed Oct. 5, 1959, Ser. No. 844,429
6 Claims. (Cl. 56—328)

This invention relates to tree shakers and more particularly involves apparatus for improving a tree shaking operation.

The instant application is a continuation-in-part of my copending application Serial No. 708,686, now abandoned, filed January 13, 1958.

It is one object of this invention to provide a tree shaker having a tree engaging member that will maintain flush surface contact with an engaged tree limb during the reciprocation of its shaker rod.

A second object is to provide a tree shaker having a reciprocated shaker rod and including means for rotating said shaker rod, thereby enabling a tree engaging member to be adjusted to the incline of a tree limb.

Another object of this invention is to provide a tree shaker having a fluid operated control system and including a manual operator for initiating the reciprocating movement of its shaker rod.

Other more specific objects of this invention will become apparent in view of the following description.

In the drawings forming a part of this disclosure and in which like parts are identified by like numerals throughout the same, FIG. 1 is a side view of a tree shaker having incorporated therein the various improvements constituting this invention.

FIG. 2 is an enlarged side view of the shaker mechanism mounted upon the projected end of a support boom, a cover housing plate being removed;

FIG. 3 is a vertical section of the shaker mechanism taken on lines 3—3 of FIG. 2 and with some parts omitted for clarity of illustration;

FIG. 4 is a schematic diagram of a fluid operated control system for initiating a continuous shaker operation;

FIG. 5 is a schematic diagram of a second embodiment of a control system, similar in operation to that of FIG. 4.

FIG. 6 is a schematic diagram of a fluid operated control system for initiating a single reciprocation of the tree shaker.

Referring to FIG. 1, there is shown a tree shaker apparatus generally comprising a tractor 10, a boom 11 pivotally connected thereto, means 11a for elevating the boom to various vertically inclined positions, and a shaker mechanism 12 mounted upon the projected end of the boom. The tractor and boom support are considered to be conventional, the invention being concerned with certain improvements in the structure of the shaker mechanism and the control system for producing a reciprocation of a shaker rod.

Shaker mechanism 12 is more particularly illustrated in FIGS. 2 and 3. In general, the shaker comprises a frame housing 13 having an annular manifold 14 threadedly connected to the free ends of the boom 11, and a tree engaging assembly 15 carried upon the projected end of a reciprocated shaker rod 16. Also, means is provided for imparting a reciprocation of rod 16, including a work cylinder 17 and related control apparatus.

Boom 11 is of a tubular construction and defines a pressure line passage communicating with the manifold 14 through holes 14a. Thus, when a source of pneumatic pressure is applied through the boom, as with a compressor unit and in a manner described in U.S. Patent No. 2,729,199, a fluid pressure source is established in manifold 14. This pressure source is then utilized for operating the work cylinder and the control systems hereinafter described.

Shaker rod 16 is rotatably and reciprocally mounted within housing 13 upon bearing mounts 18, 19 and 20. The rod extends through the cylinder 17, and connects with the piston 21 thereof. A seal 22 is provided adjacent bearing 19 to prevent undue air leakage from the cylinder about the rod, and a peripheral O-ring seal 23 about piston 21 insures a pressure seal within the working chamber of the cylinder. The cylinder head plate 24 guards the cylinder from the inward passage of foreign matter, but several exhaust ports 25 are provided to prevent unnecessary back pressure which would be caused by trapped air. In view of this construction it will be apparent that the work cylinder 17 is used only for imparting an outward thrust of the shaker rod, the return stroke being effectuated by the reverse force of a contacted tree limb at a time when the working chamber is being exhausted.

Known prior art constructions of tree engaging members do not compensate for the bending movement of a tree which is often produced by the shaker action, especially when the tree limb is engaged at an incline. As a consequence, and even though the tree engaging surface may be protected by padding materials, there is a tendency for the surfaces of the tree limb to become scuffed, often leaving open wounds. However, the tree engaging assembly 15 is particularly constructed for maintaining a flush contact with the engaged tree limb as the shaker rod is reciprocated, thereby eliminating the scuffing action.

A yoke member 26, having radial arm portions, extends outwardly from the projected end of rod 16. Within the arms of the yoke member is a concave saddle member 27, said saddle being pivotally mounted upon an axis substantially normal to the axis of shaker rod 16 and having a padded tree engaging surface 28. With this construction, and in view of FIG. 2, it will be seen that should the contacted limb bend with movement of the shaker rod, saddle 27 will pivot upon its axis, thereby accommodating a change in the limb's position.

Another aspect of this invention is providing means for adjusting the length of the shaker stroke, while also incorporating means for rotating the shaker rod 16 and tree engaging assembly 15 to whatever inclined position may be necessary for contacting a particular tree limb.

It will be noted that a gear sleeve 29 having a spur gear 30 integrally formed at one end is adjustably mounted upon rod 16 in adjacency to the manifold. Sleeve 29 is internally threaded along at least one portion thereof, mating with a threaded portion of rod 16. The sleeve is also provided with a transverse slot through a radial flange 31, and a clamping screw 32 connects opposing halves of the flange, thus forming a clamp. If screw 32 is loosened, the gear sleeve 29, together with gear 30 and flange 31, may be rotated and axially adjusted along the rod 16. The leftward movement of rod 16, as best shown in FIG. 3, is limited by the contacting engagement of sleeve 29 and the face 33 of manifold 14 which acts as a stop means. The length of the shaker stroke may thus be controlled by adjusting the position of sleeve 29 upon the shaker rod. In order to cushion the impact of gear sleeve 29 against face 33 a resilient pad 34 is attached to the contacting portion of gear 30 with several retaining screws 35.

A relatively wide faced pinion 36 is mounted within the housing upon an axis parallel to that of rod 16. Pinion 36 and gear 30 are engaged, and by rotating the pinion the shaker rod will also be rotated. Since pinion 36 and gear 30 remain engaged even while rod 16 is being operated, the face width of the pinion will be at least equal to the length of the maximum designed shaker stroke. Means, such as a flexible cable 37, is connected to the pinion, extending rearwardly to the operator's position upon the tractor. Accordingly, shaker rod 16 may be selectively rotated by manipulation of cable 37 until the tree contacting surface of assembly 15 is aligned with a particular incline of a tree limb. The pinion and flexible cable thus form a means for rotatively adjusting said shaker rod and its supported tree engaging assembly.

In accordance with an object of this invention there is also provided several fluid operated control systems for initiating the reciprocating movement of the shaker rod, each system including a manual operator. The devices and mechanism necessary for operating each of the systems may be contained within housing 13, as illustrated in FIG. 2 for the system of FIG. 4; however, the location of such mechanism is largely a matter of choice.

The control systems of FIGS. 4 and 5 employ a valve actuating means that moves with shaker rod 16, and in these systems a portion of gear sleeve 29 is also utilized as part of the actuating means. Therefore, an adjustment in the length of the shaker stroke, as above described, will simultaneously correct for a valve actuation. This fact will become more apparent in view of the drawings and the following description of their operations.

FIG. 4 schematically illustrates certain essential portions of the apparatus common to all the control systems, including a first fluid pressure line 40 between the pressure source in manifold 14 and the working chamber of cylinder 17. A fluid operated three-way two-position valve 41 is disposed in line 40, said valve providing alternative connection from cylinder 17 to either the pressure source or an exhaust port 42.

In the control system of FIG. 4, valve 41 is normally biased into the position connecting exhaust port 42 to the cylinder, and is operated oppositely only when sufficient fluid pressure is applied into operating chamber 41a. A second pressure line 43 extends between the pressure source in manifold 14 and chamber 41a, and a normally closed solenoid operated pressure control valve 44 normally obstructs the application of pressure therethrough. Power lines 45 having a switch 46 are connected to the solenoid portion of valve 44, said switch being operable from the operating position of tractor 10. In addition, a first directional control valve 47 is disposed in line 43, said valve being normally biased closed but having an operator member 47a in the path of the gear sleeve 29. A second directional control valve 48 is connected to line 43 between valve 47 and the operating chamber 41a. Valve 48 is adapted for connecting line 43 to an exhaust port 49 but has a normally biased-closed valve element which may be operated open when operator 48a is contacted by an actuating detent 50 provided on the shaker rod 16. Thus, the adjustable gear sleeve 29 and detent 50 form an actuating means for the directional control valves 47 and 48, respectively.

A tree shaker having the above described construction, including the control system of FIG. 4, is operated as follows:

Tractor 10 is moved into a position whereby the tree engaging assembly 15 contacts a selected limb of a tree. If required, assembly 15 is rotated by operation of flexible cable 37 in order to align the contacting surface of saddle 27 with the incline of the tree limb. With air pressure established in manifold 14 the tractor is next moved forward until the shaker rod 16 is pushed into a position with gear sleeve 29 in abutment with face 33 and contacting operator 47a. The shaker action is then initiated by closing switch 46, thereby energizing the solenoid of valve 44, allowing fluid pressure to be applied through line 43 into chamber 41a, and operating valve 41 to its position connecting the pressure source in manifold 14 with cylinder 17.

The piston 21 is pushed forward, moving rod 16 and actuating means 29 and 50. As sleeve 29 moves away from operator 47a, valve 47 closes, shutting off the pressure source. But the pressure is maintained in line 43 until detent 50 contacts operator 48a at the end of the shaker stroke. At that time pressure line 43 is bled through the exhaust port 49, causing valve 41 to be operated by its biasing means into a position shutting off the pressure source from manifold 14 and connecting cylinder 17 to the exhaust port 42. The shaker rod 16 is now acted upon by the stored forces in the tree limb, causing it to be moved rearwardly into the starting position. If switch 46 is held closed (valve 44 operated open), the above described shaker cycle will continue to function. However, the number of shaker strokes may be controlled, for any time switch 46 is opened, the shaker action will be terminated at the completion of that cycle.

FIG. 5 illustrates another embodiment of a control system that may be used for operating the tree shaker apparatus. Working cylinder 17 is adapted to be connected to the pressure source in manifold 14 through a pressure line 40' including a three-way two-position fluid operated valve 51. Valve 51 provides alternative connections from cylinder 17 to either the pressure source or to an exhaust port 52, and in this respect is similar to valve 41. But valve 51 is normally biased into a position connecting cylinder 17 to the pressure source and is oppositely actuated by the application of fluid pressure in chamber 51a. A second pressure line 43' extends from the pressure source in manifold 14 through directional control valve 48' having an operator 48a' into the chamber 51a. Connected to line 43' between valve 48' and chamber 51a is an exhaust line 49' including directional control valve 47' having an operator 47a' and a two-way two-position solenoid operated valve 44' having an electrical operating connection through power lines 45' and switch 46'. Valves 47' and 48' are normally biased closed valves, as is valve 44'.

Since valve 51 is normally open between the pressure source and cylinder 17, upon initially establishing pressure in manifold 14 the piston will be moved forward, causing detent 50 to contact operator 48'a (as shown) and allowing pressure to occupy chamber 51a. With the application of pressure in chamber 51a, valve 51 closes the passage from cylinder 17 to manifold 14 and opens the passage to exhaust port 52. The tractor 10 is now moved into a position placing tree engaging assembly against a tree limb and forcing shaker rod 16 backward. As detent 50 moves away from operator 48'a, valve 48' closes, but the fluid pressure in line 43' between valve 48' and chamber 51a is retained. When sleeve 29 contacts operator 47a', valve 47' opens allowing the pressure to be transmitted to valve 44'. Since the latter valve remains closed until switch 46' is operated closed, the operating pressure in chamber 51a is still retained. The control system is now conditioned for initiating a shaker operation, and as soon as valve 44' is opened the pressure line is exhausted, opening valve 51. The sequence of valve operations, controlled by the actuating means 29 and 50, is then repeated and will continue until switch 46' is opened, thereby closing valve 44', and in turn valve 51.

FIG. 6 is a control system for operating the shaker rod 16 a single stroke at a time. Such a system is extremely desirable for apricots and other soft fruits which are easily jarred from the trees. A first fluid passage line 40" is adapted for connecting manifold 14 with cylinder 17 and includes a three-way two-position valve 53, said valve being fluid operated between a first position connecting the cylinder 17 to manifold 14 and a second position connecting the cylinder to an exhaust port 54. Valve 53 may be biased to either one of its two positions and is then operated to the other position by the application of fluid pressure in line 43". Line 43" interconnects chamber 53a with manifold 14 through a three-way two-position solenoid operated control valve 55, also having an exhaust port 56. Valve 55 is normally biased into that position which will operate valve 53 closed to the pressure source. Assuming that valve 53 is biased into the position connecting cylinder 17 to exhaust port 54, then valve 55 is to be normally biased into a position connecting chamber 53a to exhaust port 56. When the shaker rod 16 is to be moved, switch 46" is closed causing the solenoid valve 55 to be operated and apply fluid pressure to the line 43", thereby operating valve 53 and connecting cylinder 17 to the pressure source. The rod 16 will remain extended until switch 46" is opened, at which time the valves 55 and 53 are reversely operated. The engaged tree limb then pushes the shaker rod into its original position.

It is to be understood that the forms of the invention herewith shown and described are to be taken as preferred embodiments thereof, and that various changes in the shape, size and arrangement of parts may be resorted to without departing from the spirit of this invention or the scope of the attached claims.

Having thus described by invention, what I claim and desire to secure by Letters Patent is:

1. A tree shaker adapted to be attached to a tractor, comprising frame members spaced apart, a manifold connecting one end of said frame members, a cylinder connecting the opposite end of said frame members, a piston reciprocable in the cylinder, a piston rod connected to said piston and passing through each end of said cylinder, a hollow boom connected to said manifold, a yoke threaded to one end of the piston rod, a saddle pivoted to said yoke, a resilient seat attached to the saddle, an air cylinder attached intermediate the frame members, a pipe line connecting said air cylinder to the first mentioned cylinder and manifold to reciprocate the piston, and electrically controlled means within the frame members to open and close said pipe lines.

2. A tree shaker as defined in claim 1 having a piston rod of three diameters, one of which is threaded; an annular detent registering with a shoulder formed on said piston rod, a lock nut holding said detent in fixed position, a revoluble sleeve operable on said threaded portion, to regulate the stroke of the piston rod, and a shaft formed at the free end of said piston rod which operates in a bushing inserted into the manifold.

3. Tree shaker apparatus comprising: a frame; a fluid cylinder mounted on said frame and including a piston stem extending through the forward and rear ends of said cylinder; a tree limb engaging member mounted on the forward end of said stem; a fluid pressure chamber mounted on said frame; a first fluid pressure line connected at one end to said fluid pressure chamber and connected at its other end to one end of said cylinder; a motor-actuated three-way two-position valve interposed in said first fluid pressure line for selectively venting said cylinder to atmosphere or for, in the alternative, establishing communication between said cylinder and said fluid pressure chamber; a second fluid pressure line connected at one of its ends to said fluid pressure chamber and communicating at its other end to the motor of said motor-actuated three-way two-position valve; a second two-way two-position valve mounted on said frame adjacent said piston stem and connected to said second fluid pressure line for venting said second fluid pressure line to atmosphere; a third two-way two-position valve mounted on said frame adjacent said piston stem and spaced from said second valve, said third valve being interposed in said second fluid pressure line between said second valve and said fluid pressure chamber, and said third valve being arranged to selectively open or close said second fluid pressure line; a first valve actuator mounted on said piston stem and arranged to operate said second valve in response to the reciprocation of said piston stem; and a second valve actuator adjustably mounted on said piston stem in spaced relation to said first valve actuator and arranged to operate said third valve in response to the reciprocation of said piston stem.

4. A tree shaker apparatus of the character set forth in claim 3 wherein a fourth motor-operated two-way two-position valve is interposed in said second fluid pressure line intermediate said fluid pressure chamber and said third valve.

5. A tree shaker comprising: a reciprocable shaft; a U-shaped yoke on the free end of said shaft; a U-shaped saddle having end portions pivotally connected to end portions of said yoke and tree-engaging means on the interior portion of said saddle.

6. A tree shaker of the character set forth in claim 5 provided with means for rotating said shaft on its own axis.

References Cited in the file of this patent

UNITED STATES PATENTS

| | | |
|---|---|---|
| 1,763,707 | Irish | June 17, 1930 |
| 2,729,199 | Jones | Jan. 3, 1956 |
| 2,769,298 | Jones | Nov. 6, 1956 |
| 2,804,743 | Gould et al. | Sept. 3, 1957 |